June 5, 1934.  B. J. MEARS  1,961,639
AUTOMOBILE HEATING AND VENTILATING SYSTEM
Filed Jan. 16, 1931    2 Sheets-Sheet 1

INVENTOR.
Barton J. Mears
BY Slough and Canfield
ATTORNEY.

June 5, 1934.　　　　B. J. MEARS　　　　1,961,639
AUTOMOBILE HEATING AND VENTILATING SYSTEM
Filed Jan. 16, 1931　　　2 Sheets-Sheet 2

INVENTOR.
Barton J. Mears
BY Slough and Canfield
ATTORNEY.

Patented June 5, 1934

1,961,639

UNITED STATES PATENT OFFICE 1,961,639

AUTOMOBILE HEATING AND VENTILATING SYSTEM

Barton J. Mears, Cleveland, Ohio

Application January 16, 1931, Serial No. 509,164

16 Claims. (Cl. 123—174)

This invention relates to heating and ventilating means for the body interiors and other parts of motor vehicles.

It is one of the objects of this invention to provide an improved apparatus for heating and/or ventilating the interior of the body portion of a motor vehicle.

Another object is to provide an improved apparatus for employing waste heat from the motor vehicle engine in the heating of the vehicle interior and other parts thereof.

Another object is to provide an improved apparatus for applying waste heat from the engine to the heating of the interior and other parts of a motor vehicle and an improved manual control for the same.

Another object is to provide an improved heater for the interiors of motor vehicle bodies adapted to employ waste heat from the engine.

Another object is to provide an apparatus whereby the suction of the engine in its intake manifold or carburetor may be employed to ventilate and cool a motor vehicle car body interior and/or the engine oil supply, or whereby the exhaust heat of the engine, for example, in its exhaust manifold, may be employed to heat the interior of the vehicle body and/or the oil supply, and a manual control whereby one or another of the possible functions referred to may be selectively brought into operation.

Another object is to provide an improved apparatus for controlling the temperature of the oil supply of an internal combustion engine.

Another object is to provide an apparatus whereby the temperature of the oil supply of an internal combustion engine such as employed on a motor vehicle may be increased when the oil is cold and decreased when the oil is hot combined with manually operated means for selectively determining the increase or decrease of temperature.

Another object is to provide an improved apparatus for applying exhaust heat of the engine to increase the temperature of the oil supply of the engine.

Another object is to provide an improved oil heater for heating the oil supply of an engine.

Other objects will be apparent to those skilled in the art to which my invention appertains.

My invention is fully disclosed in the following description taken in connection with the accompanying drawings, in which:

Fig. 4 is a fragmentary view to an enlarged scale of a conduit valve mechanism which I may employ, the view being taken approximately from the plane 4 of Fig. 1;

Fig. 5 is a sectional view to an enlarged scale taken on the line 5 of Fig. 4;

Fig. 6 is a view similar to Fig. 5 with parts thereof in different positions;

Figure 1:
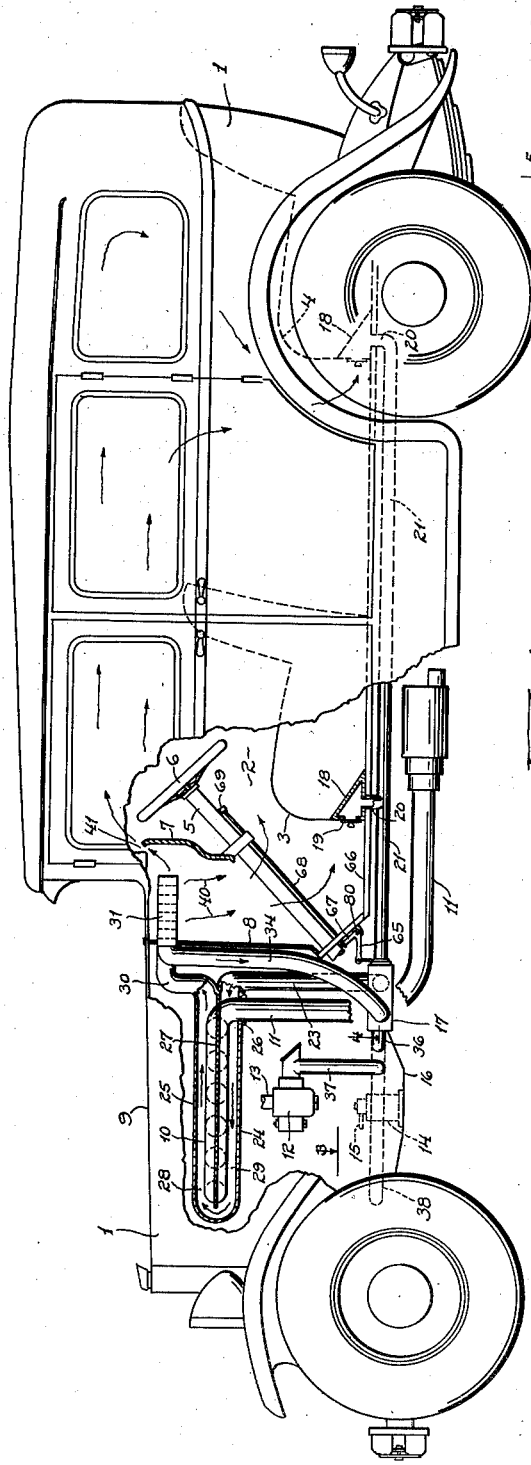
Fig. 1 is a side elevational view of a motor vehicle, with parts thereof broken away and parts in section to illustrate an embodiment of my invention.

Referring to the drawings, I have shown generally at 1 a motor vehicle of the enclosed body type. The vehicle comprises a body interior portion, shown generally at 2, seats for the occupant 3 and 4, a steering post 5 and steering wheel 6, a control or instrument board 7, a cowl board 8, an engine cover or hood 9 under which is disposed an engine comprising an exhaust manifold 10, an exhaust pipe 11, a carburetor 12, an intake pipe 13 and other parts of the engine not shown for the sake of simplicity and which may be of any known and desired or suitable construction.

In the bottom of the engine casing 16 is disposed an oil pump 14 adapted to pump oil through conduits such as 15 to various parts of the engine to be lubricated, the pump 14 being preferably, in accordance with recognized practice, located in the lowert part of the casing 16.

Other parts of the motor car will be recognized from the drawings but, inasmuch as they form no essential part of my invention, need no description herein.

At this point it may be stated that, in the operation of my invention, the suction created by the engine in the intake line 13 and carburetor 12, is employed in a manner to be more fully described to draw air from the interior 2 of the car body to supply the necessary air for combustion in the carburetor. By means of a valve construction shown generally at 17 in Figs. 1 and 2, and shown separately in Figs. 4 to 8 inclusive, the air on the way from the car body to the carburetor may, optionally, and under the control of manual means, be directed through a conduit system to cool the oil supply to the engine or, directed through a conduit system including a heater to heat the air in the car interior 2 and to heat the oil supply for the engine.

The apparatus for controlling and directing the flow of air as above referred to will now be described.

In the car interior 2 and preferably at the forward bottom portion of each of the seats 3 and 4, is disposed an air outlet chamber 18 communicating by means of an adjustable grille 19 with the car interior 2 and having an outlet conduit 20 connected to a conduit 21. The conduit 21 thus connecting both of the chambers 18 is continued toward the forward part of the car where it is joined to the valve device 17, see Fig. 4. The valve device 17 has generally two operative positions, one of which is shown in Fig. 4. The device 17 will be more fully described later but here it will suffice to say that air from the conduit 21 enters a chamber 22 of the device and leaves the chamber through a lateral wall thereof and enters a conduit 23, Figs. 4 and 1. The conduit 23 extends generally upwardly from the device 17 and communicates at its upper end with a stove device 24 comprising a chamber wall 25 entirely enclosing the exhaust manifold 10. The exhaust line 11 extends outwardly through the wall 25 through a close fitting or otherwise substantially sealed aperture 26. In a similar manner, the branches of the exhaust manifold 10 on their way from the manifold 10 to the respective engine cylinders, pass through the wall 25 through close fitting or sealed apertures therein similar to the aperture 26. These latter apertures are not illustrated but will be readily understood by those skilled in the art in view of the showing of the aperture 26. The stove device 24 is preferably divided by a partition 27 to form upper and lower conduit portions 28 and 29 respectively.

By means of the above described stove device, air flowing upwardly through the conduit 23 and discharged therefrom into the stove device 24 flows toward the left, Fig. 1, through the conduit portion 29, upwardly around the left end of the partition 27 and toward the right through the conduit portion 28, discharging from the device through a conduit 30.

Figure 2:
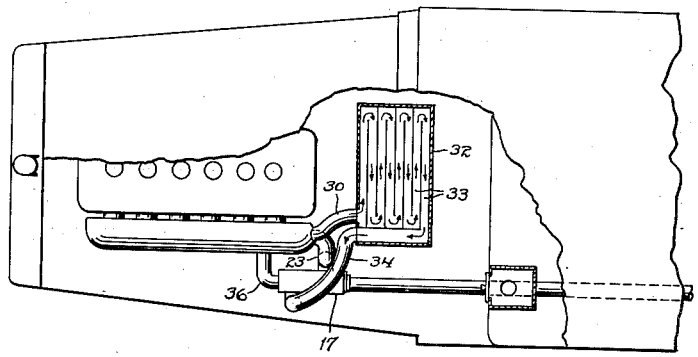
Fig. 2 is a fragmentary top plan view of the forward part of a motor vehicle, with parts broken away and parts omitted for simplicity, and illustrating the embodiment of my invention of Fig. 1.

The conduit 30 leads to a radiator 31 preferably disposed behind the cowl board 8 and in front of the instrument panel 7. The heater 31, Figs. 1 and 2, may be of any construction suitable to permit the passage of heated air therethrough in a closed conduit and to transmit the heat to surrounding air of the car interior 2 to heat the same. The heater illustrated in the drawings comprises a generally rectangular box 32 entirely enclosed on all sides and having its interior divided up by generally parallel partitions 33—33 in a manner to provide a zig-zag labyrinthine path through the box 32, whereby a great area of metal material of the box is exposed to the hot air. As stated above, the conduit 30 enters the box as shown in Fig. 2 and the heated air therefrom flows through the conduit path in the box, following the arrows, and leaves the box by a conduit 34.

Figure 3:
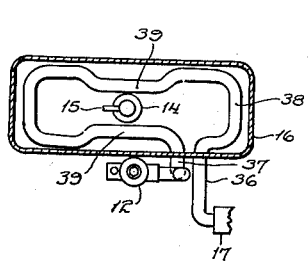
Fig. 3 is a fragmentary view taken approximately from the plane 3 of Fig. 1.

The conduit 34 is conducted generally downwardly to the valve device 17, and the air flowing therethrough enters a second chamber of the device, 35. The air leaves the chamber 35 by a generally horizontal conduit 36, Figs. 1, 3 and 4, the conduit 36 entering the casing 16 of the motor and formed into a loop therein laterally leaving the casing by a conduit portion 37 leading to the intake side of the carburetor 12.

The loop of the conduit, shown generally at 38 in the casing 16, may have any suitable shape or configuration but preferably I so form it that at two portions 39—39 thereof, it lies in close proximity to the pump 14 in the lower part of the casing 16, and in engines in which there is a reservoir of oil in the bottom of the casing, the loop portion 38 is preferably immersed in the oil.

In the operation of my invention thus far described, when the engine is running, it creates suction in the carburetor and a supply of air to the carburetor flows, as above described, from the interior of the car body 2, through the conduit 21 to the stove device 24 where it is heated by heat from the exhaust manifold. Thence it flows through the heater 31, giving up some of its heat to the air in the car body. Thence it continues to flow by its closed conduit system to and through the loop 38 in the engine casing where it gives up more of its heat to the lubricating oil therein, particularly heating the pump 14 to render the oil more fluid and to facilitate the circulation thereof by the pump. Thence the air flows direct to the carburetor and the remaining heat therein assists in the carburetion of the gasoline fuel.

Thus the air of the car interior 2 is heated indirectly, and is not mixed with air or gases coming directly from the engine and associated parts under the engine hood as has been done in prior heating systems. Also the interior air of the car is continually renewed by being exhausted therefrom through the suction line 21. An air supply to the interior of the car may be effected through cracks around the doors and windows or by partly opened windows for ventilation purposes.

Optionally, the valve device shown generally at 17 may be operated in a manner to be described to close off the connection from the chamber 22 to the conduit 23, and from the conduit 34 to the chamber 35 and to open a passageway directly from the chamber 22 to the chamber 35. When this operative change has been made in the valve device, it will be observed that the flow of air through the stove device 24 and through the heater 31 is cut off and air from the conduit 21 flows directly through the valve device 17 to the conduit 36, and thence through the conduit loop 38 and directly to the carburetor. The operation of my invention in this condition is to continually exhaust air from the car interior, and this air being relatively cool, is drawn through the oil in the engine base and cools the same and particularly cools the pump 14.

By providing air outlet chambers 18 in parts of the car interior 2 remote from the heater 31, the hot air, which has been heated by the heater 31, will be circuated through all parts of the car interior. The flow of heated air through the car body is relatively gentle and slow and thus passengers are not subjected to blasts of hot air such as are frequently met with in prior practice. This desirable result may be furthered by disposing the heater 31 as shown in the drawings up behind the instrument panel 7 to protect the passengers in the forward seat 3 from heat which might be directly radiated to them from the heater 31. If desired, the heated air from the heater 31 may flow downwardly therefrom as indicated by the arrows 40—40, or may flow upwardly over the top of the instrument panel 7 through suitable orifices 41.

The valve device 17 will now be described. It comprises generally a cylindrical chamber 50 into one end of which the conduit 21 opens and the other of which discharges into the conduit 36. The chamber 50 has a transverse partition 51 disposed substantially at its middle. Mounted at the center of the partition 51 is a rotatable shaft 52 extending from the partition 51 in both directions. Upon one end is mounted the closed end 53 of a cup-like valve element 54 substantially slidably fitting the inner surface of the cylindrical chamber 50, and the closed end or bottom 53 thereof lying in engagement with the partition 51. The valve element 54 has in its cylindrical wall an opening 55 adapted to register with the corresponding opening 56 in the wall of the chamber 50, the latter opening communicating with and being sealed with the conduit 23. On the opposite side of the partition 51 from the valve element 54 is a similar valve element 57, of generally cup-shape, and having its bottom 58 lying in engagement with the partition 51. The valve element 57 has an opening 59 in the side wall thereof adapted to register with a similar opening 60 in the wall of the chamber 50, the latter opening communicating with and being sealed to the conduit 34.

The shaft 52 has preferably axially extending portions 61 and 62 secured to the bottoms 53 and 58 of the valve elements 54 and 57 whereby the two valve elements may rotate in unison, the rotational movement of one being communicated to the other through the shaft 52. The valve element 54 is extended outwardly from one end of the chamber 50 and has connected thereto, see Fig. 8, an arm 63 to which is pivotally connected a link 64, pivotally connected at its upper end to one arm 65 of a bell crank pivoted as at 80 in Fig. 1 to the floor 66 of the vehicle and having a second bell crank arm 67 to which is connected a control rod 68 disposed along the side of the steering post 5 and having a button or head or knob 69 on the upper end thereof. Upon propelling the rod 68 longitudinally, the bell crank will be oscillated and communicate a rotary movement in one direction or the other to the two valve elements 54 and 57 in a manner which will be understood.

The partition 51 has therein sector-form apertures 70 and the valve element bottom 53 has therein a pair of sector-form apertures 71. The bottom 58 of the valve element 57 has a pair of sector-form apertures 72 of substantially the same size as and aligned with the apertures 71.

With the parts in the position illustrated in Fig. 4, the apertures 71 in the bottom 53 and the aligned apertures in the bottom 58, not shown, are not in registration with the apertures 70 in the partition 51, and hence flow of air from the chamber 22 to the chamber 35 is cut off. At this time the openings 55 and 56 register with each other and the openings 59 and 60 register with each other, permitting flow from the chamber 22 to the conduit 23, and from the conduit 34 to the chamber 35. Upon operating the bell crank lever 65 as above described, both of the valve elements 54 and 57 will be rotated through approximately a quarter of a revolution. This movement will bring the two aligned perforations of the bottoms 53 and 58 into registration with the perforations 70 in the partition 51 and will move the openings 55 and 59 respectively out of registration with the openings 56 and 60 thereby cutting off flow through the conduits 23 and 34 and permitting flow directly through the device from the chamber 22 to the chamber 35.

Figure 7:
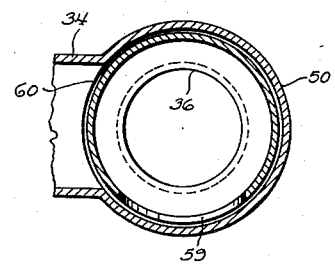
Fig. 7 is a view similar to Fig. 5 but taken on the line 7 of Fig. 4.
Figure 8:
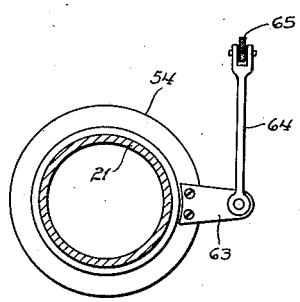
Fig. 8 is a view taken on the line 8 of Fig. 4, drawn to a larger scale and with parts behind the sectional plane omitted.

The position of the parts in their rotated positions is shown in Figs. 6 and 7.

My invention is not limited to the exact details of construction shown and described hereinbefore. Many changes and modifications may be made therein without departing from the spirit of my invention or sacrificing its advantages.

I claim:

1. In combination with an internal combustion engine driven vehicle comprising a body and a carburetor and an air supply suction intake associated therewith and an engine base casing, a closed air conduit beginning at the said suction intake, continuing into and through and out of the engine base casing, and thence to the car body interior and opening thereinto.

2. In combination with an internal combustion engine driven vehicle comprising a body and a carburetor and an air supply suction intake associated therewith and an engine base casing, a closed air conduit beginning at the said suction intake, continuing into and through and out of the engine base casing, and thence to the car body interior and opening thereinto to conduct air from the car body interior and cause it to absorb and conduct away heat from the engine base interior.

3. In combination with an internal combustion engine driven vehicle comprising a body and a carburetor and an air supply suction intake associated therewith and an engine base casing and engine oil supply apparatus in the casing, a closed air conduit beginning at the said suction intake, continuing into and through and out of the engine base casing, and disposed therein adjacent the said engine oil supply apparatus, and continuing thence to the car body interior and opening thereinto.

4. In combination with an internal combustion engine driven vehicle comprising a body and a carburetor and an air supply suction intake associated therewith and an engine base casing and engine oil supply apparatus in the casing, a closed air conduit beginning at the said suction intake, continuing into and through and out of the engine base casing, and disposed therein adjacent the said engine oil supply apparatus, and continuing thence to the car body interior and opening thereinto to conduct air from the car body interior to cause it to flow through the conduit in the casing to absorb and conduct away heat from engine oil in the engine base.

5. In combination with an internal combustion engine driven vehicle comprising a body and a carburetor and an air supply suction intake associated therewith, a vehicle body interior heater, a stove associated with the exhaust conduit system of the engine, and a closed air conduit beginning at the said suction intake, continuing to and through the vehicle interior heater, thence to the stove and thence to the vehicle body interior.

6. In combination with an internal combustion engine driven vehicle comprising a body and a carburetor and an air supply suction intake associated therewith, a vehicle body interior heater, a stove associated with the exhaust conduit system of the engine, and a closed air conduit beginning at the said suction intake, continuing to and through the vehicle interior heater, thence to the stove, and thence to the vehicle body interior, and adapted to conduct air from the vehicle interior and to cause it to be heated by the engine exhaust gases and to transfer heat to the air in the vehicle interior.

7. In combination with an internal combustion engine driven vehicle comprising a body and a carburetor and an air supply suction intake associated therewith and an engine base casing and engine oil supply apparatus in the casing and an engine exhaust conduit, a heater for the vehicle interior, a stove associated with the exhaust conduit, a closed air conduit beginning at the said suction intake, continuing into and through and out of the engine base casing and disposed therein adjacent the oil supply apparatus, and continuing thence into and through the vehicle interior heater and thence through the stove and thence to the vehicle body interior and opening thereinto.

8. In combination with an internal combustion engine driven vehicle comprising a body and a carburetor and an air supply suction intake associated therewith and an engine base casing and engine oil supply apparatus in the casing and an engine exhaust conduit, a heater for the vehicle interior, a stove associated with the exhaust conduit a closed air conduit beginning at the said suction intake and continuing into and through and out of the engine base casing and disposed therein adjacent the oil supply apparatus, and continuing thence into and through the vehicle interior heater and thence through the stove and thence to the vehicle body interior opening thereinto, and adapted to conduct air from the vehicle interior to cause it to be heated by the engine exhaust gases in the exhaust conduit and to transfer heat to the air in the vehicle interior and to engine oil in the engine casing.

9. In combination with an internal combustion engine driven vehicle comprising a body and a carburetor and an air supply suction intake associated therewith, and a heater for heating the vehicle interior, a stove device associated with an exhaust conduit system, a conduit leading from the vehicle interior to the said suction intake, and a branch conduit whereby air in the vehicle interior on the way to the carburetor may be diverted to and through the stove device and thence to and through the heater and thence to the carburetor, valve means for optionally opening or closing the branch conduit and manual means for operating the valve.

10. In combination with an internal combustion engine driven vehicle comprising a body and a carburetor and an air supply suction intake associated therewith and an engine oil supply apparatus and an engine exhaust conduit, a heater for heating the vehicle interior, a stove device associated with the exhaust conduit, a closed air conduit leading from the vehicle interior to the said suction intake, a portion of the said conduit being disposed adjacent the oil supply apparatus, and a branch conduit between the vehicle interior and the carburetor whereby air from the vehicle interior may be drawn through the stove and thence through the heater, and manually operable valve means for optionally opening and closing the branch conduit.

11. In combination with an internal combustion engine driven vehicle comprising a body and a carburetor and an air supply suction intake associated therewith, a vehicle body interior heater, an air heating means associated with the exhaust conduit system of the engine, and a closed air conduit beginning at the said suction intake, continuing to and through the vehicle interior heater, thence to the air heating means and thence to the vehicle body interior.

12. In combination with an internal combustion engine driven vehicle comprising a body and a carburetor and an air supply suction intake associated therewith, a vehicle body interior heater, an air heating means associated with the exhaust conduit system of the engine, and a closed air conduit beginning at the said suction intake, continuing to and through the vehicle interior heater, thence to the air heating means, and thence to the vehicle body interior, and adapted to conduct air from the vehicle interior and to cause it to be heated by the engine exhaust gases and to transfer heat to the air in the vehicle interior and opening thereinto.

13. In combination with an internal combustion engine driven vehicle comprising a body and a carburetor and an air supply suction intake associated therewith, and an engine base casing and engine oil supply apparatus in the casing and an engine exhaust conduit, a heater for the vehicle interior, an air heating means associated with the exhaust conduit, a closed air conduit beginning at the said suction intake, continuing into and through and out of the engine base casing and disposed therein adjacent the oil supply apparatus, and continuing thence into and through the vehicle interior heater and thence through the air heating means and thence to the vehicle body interior.

14. In combination with an internal combustion engine driven vehicle comprising a body and a carburetor and an air supply suction intake associated therewith, and an engine base casing and an engine oil supply apparatus in the casing and an engine exhaust conduit, a heater for the vehicle interior, an air heating means associated with the exhaust conduit, a closed air conduit beginning at the said suction intake and continuing into and through and out of the engine base casing and disposed therein adjacent the oil supply apparatus, and continuing thence into and through the vehicle interior heater and thence through the air heating means and thence to the vehicle body interior opening thereinto, and adapted to conduct air from the vehicle interior to cause it to be heated by the engine exhaust gases in the exhaust conduit and to transfer heat to the air in the vehicle interior and to engine oil in the engine casing.

15. In combination with an internal combustion engine driven vehicle comprising a body and a carburetor and an air supply suction intake associated therewith, and a heater for heating the vehicle interior, an air heating means associated with an exhaust conduit system, a conduit leading from the vehicle interior to the said suction intake, and a branch conduit whereby air in the vehicle interior on the way to the carburetor may be diverted to and through the air heating means and thence to and through the heater and thence to the carburetor, valve means for optionally opening or closing the branch conduit and manual means for operating the valve.

16. In combination with an internal combustion engine driven vehicle comprising a body and a carburetor and an air supply suction intake associated therewith and an engine oil supply apparatus and an engine exhaust conduit, a heater for heating the vehicle interior, an air heating means associated with the exhaust conduit, a closed air conduit leading from the vehicle interior to the said suction intake, a portion of the said conduit being disposed adjacent the oil supply apparatus, and a branch conduit between the vehicle interior and the carburetor whereby air from the vehicle interior may be drawn through the air heating means and thence through the heater, and manually operable valve means for optionally opening and closing the branch conduit.

BARTON J. MEARS.